Figure 1:
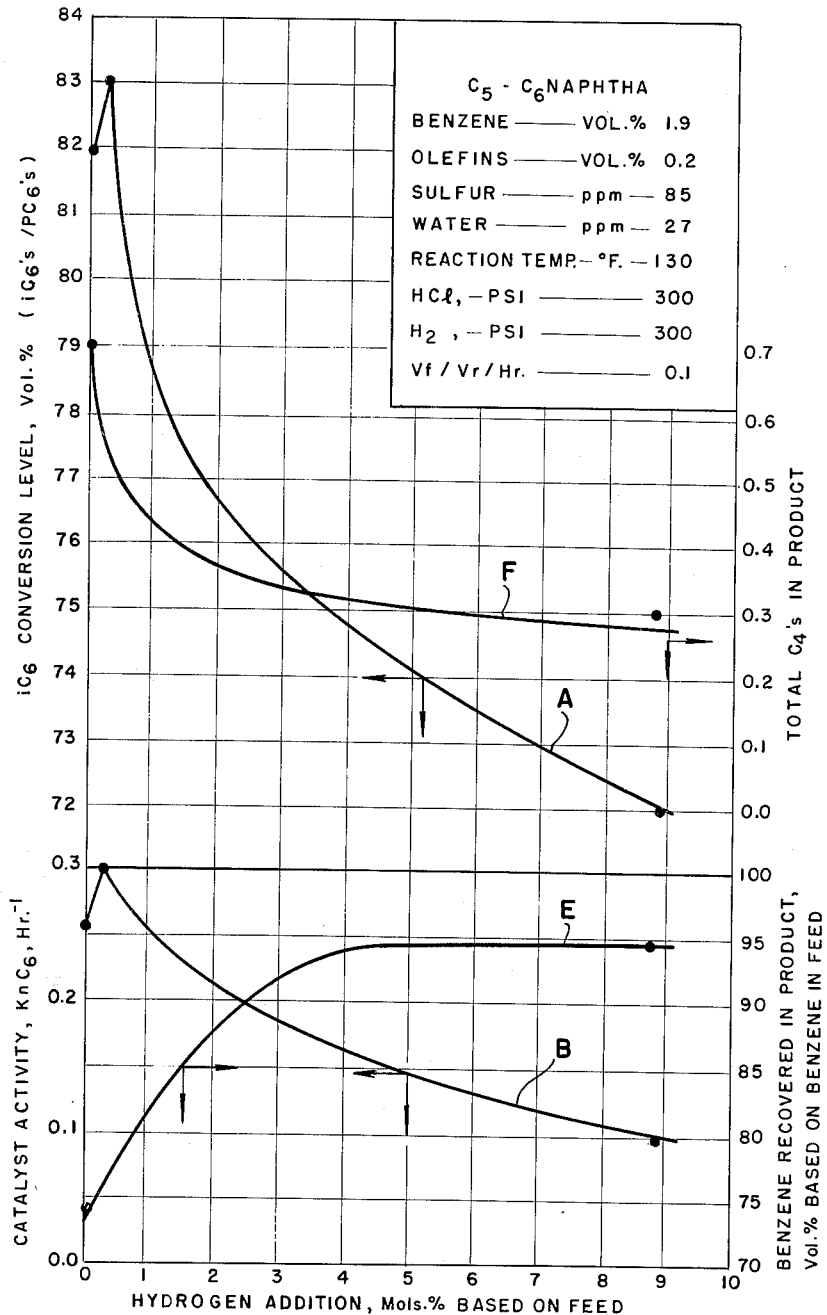

FIG. I. HYDROGEN ADDITION RATE VS. CATALYST ACTIVITY, BENZENE RECOVERY, ISOHEXANES CONVERSION LEVEL AND TOTAL C₄'s IN PRODUCT

EFFECT OF HYDROGEN ADDITION RATE ON CATALYST ACTIVITY ($K_n C_5$) AND ISOPENTANE CONVERSION LEVEL.

INVENTOR.
BOYD N. HILL, 3,201,496
ISOMERIZATION PROCESS
Boyd N. Hill, Baytown, Tex., assignor, by mesne assignments, to Esso Research and Engineering Company, Elizabeth, N.J., a corporation of Delaware
Filed Sept. 28, 1961, Ser. No. 141,369
1 Claim. (Cl. 260—683.75)

This invention relates to an improved process for the catalytic isomerization of paraffinic hydrocarbons alone or together with naphthenic hydrocarbons at low temperatures and high hydrogen chloride pressure in the presence of hydrogen and aluminum chloride.

It is known to catalyze the isomerization of n-paraffins with aluminum chloride complexes using relatively low hydrogen chloride pressure, e.g., 8% by weight or less hydrogen chloride based on the hydrogen chloride-hydrocarbon mixture in the reactor and relatively high reaction temperatures, e.g., 200° to 250° F. However, when operating at reaction temperatures of 200° to 250° F. required for good catalytic activity, thermodynamics favor the formation of singly branched relatively low octane number isomers (methyl pentanes) rather than the doubly branched, high octane number isomers (dimethyl butanes). As an example, in n-hexane isomerization, the methyl pentanes have leaded octane numbers (research and motor) of about 90 as compared with 104–105 for the dimethyl butanes. At lower reaction temperatures, 145° F. and lower, the thermodynamic equilibrium favors formation of the dimethyl butanes; but aluminum chloride catalysts at these temperatures and at low hydrogen chloride pressures are essentially inactive.

Another factor favoring lower reaction temperatures is that in the case of isomerization of methylcyclopentane to cyclohexane, the thermodynamic equilibrium at 120° F. is reached at about 15 methyl cyclopentane and 85 cyclohexane volume percents, as compared to an equilibrium of about 35 methylcyclopentane and 65 cyclohexane volume percents at 200° F.

Cracking and deleterious side reactions are greatly minimized at temperatures of 145° F. and lower; above 145° F. the cracking rate increases very rapidly. Therefore, by operating at 145° F. and lower, a great improvement is obtainable in hydrocarbon degradation to undesirable products and subsequent aluminum chloride consumption.

Additionally, it is known that corrosion of equipment in this type catalyst system is greatly reduced by lowering the reaction temperature below 145° F. A critical breakpoint appears about 145° F. because below that temperature, less expensive alloy steel can be employed.

These factors are disclosed and claimed in U.S. patent application Serial No. 26,256 entitled "Isomerization Process," filed May 2, 1960, by B. N. Hill, and now abandoned. Essentially, this application covers a method of isomerizing n-paraffins and naphthenes which includes contacting a hydrocarbon feed consisting essentially of paraffinic and cyclo paraffinic hydrocarbons with aluminum chloride and hydrogen chloride at a temperature in the range of 110° F. to 145° F., the hydrogen chloride partial pressure (above about 175 to 200 p.s.i.) being sufficient to maintain in the liquid phase in the reactor at least about 10 to 12 weight percent of hydrogen chloride based on the hydrogen chloride-hydrocarbon mixture. When aromatic hydrocarbons are present in the feed, hydrogen pressure is used to prevent or inhibit deleterious side reactions. The catalyst preferably is solid anhydrous aluminum chloride but a supported aluminum chloride catalyst or a fluidized catalyst impregnated with aluminum chloride may be employed instead.

The tolerance to aromatics in the feed is good in this system relative to known aluminum chloride systems. For example, other investigators have disclosed that the feed in their isomerization systems must be essentially free of aromatics in order to maintain reasonably good catalyst activity and catalyst life. Whereas, in the process disclosed in the Hill patent application noted supra, no appreciable decline in catalyst activity and no appreciable loss in the aromatics charged to the system occur; also, severe complexing of the aromatics with the aluminum chloride-hydrogen chloride catalyst resulting in excess catalyst consumption does not occur.

An important feature of this process, is the high reaction rates achieved. In the previously mentioned known aluminum chloride systems, reaction rates are so slow as to discourage commercial application thereof. Whereas, the high reaction rates obtained by the high hydrogen chloride pressure, low reaction temperature technique make this process commercially attractive.

It has been discovered that in this type isomerization system, the addition of small critical amounts of hydrogen at relatively low hydrogen partial pressures keeps cracking and deleterious side reactions at a minimum and maintains catalyst activity at a maximum. Although it is well-known to the art to use hydrogen to suppress cracking and deleterious side reactions when isomerizing hydrocarbons with aluminum halide catalyst previous investigators have used large quantities of hydrogen, e.g., 500 to 4,000 cubic feet per barrel of feed at relatively high hydrogen partial pressures, e.g., 500 to 2,000 p.s.i. The use of such quantities of hydrogen at these partial pressures increases the cost of construction and operation and also greatly suppresses the activity of the aluminum halide catalyst.

In particular, improvement in the isomerization process comprises adding critical amounts of hydrogen within the range of 4.0 and 0.3 mol percent hydrogen per mol of feed which is equivalent to 3 to 41 cubic feet per barrel in a system or a technique which includes contacting a paraffinic and/or cyclo paraffinic hydrocarbon feed with aluminum chloride and hydrogen chloride at a temperature in the range of 110° F. to 145° F. The hydrogen chloride partial pressure used is sufficient to maintain in the liquid phase in the reactor preferably at least about 10 to 12 weight percent of hydrogen chloride based on the hydrogen chloride-hydrocarbon mixture.

Thus, a primary object of the present invention is to provide an improved highly active catalytic isomerization process, which operates at low, more favorable temperatures; which reduces or inhibits cracking; which provides increased reaction rates; and which forms the more desirable highly-branched isomers.

Figure 2:
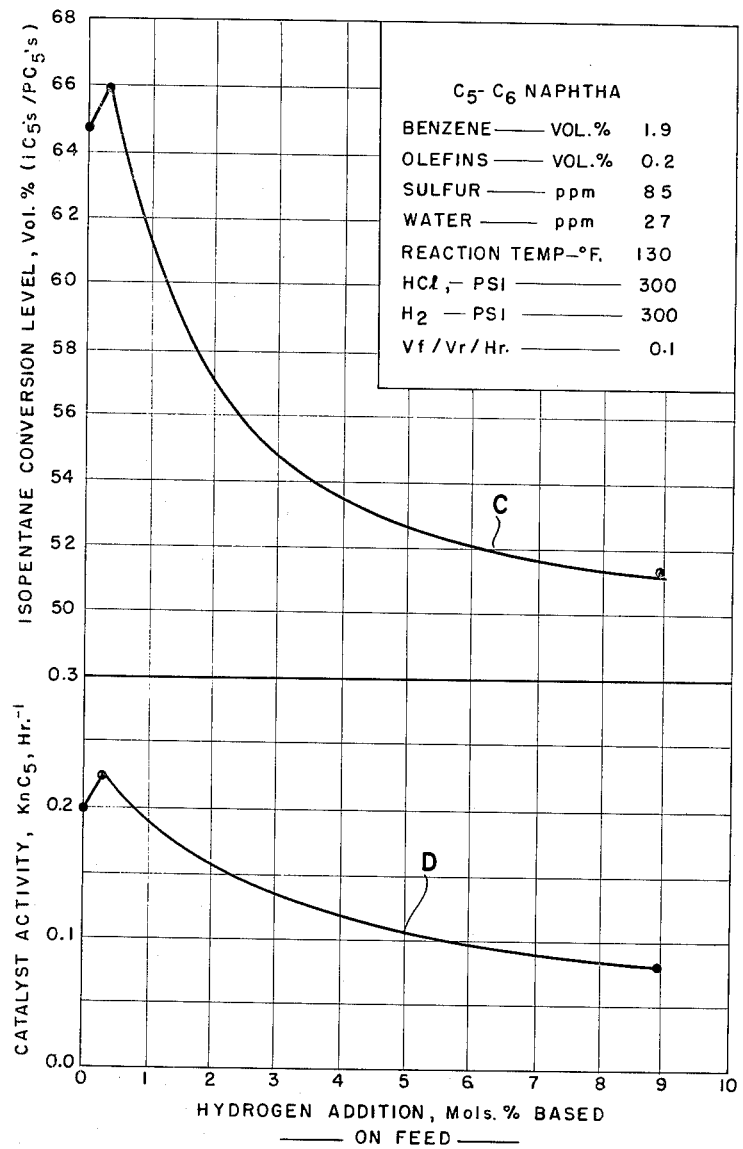

This and other objects and advantages of the invention will become apparent from the following description thereof when taken in conjunction with the drawings wherein:

FIG. 1 shows curves representing the effect of hydrogen addition rate vs. catalyst activity ($k_{nC_6}$), benzene recovery, isohexane conversion level, and total butanes ($C_4$'s) in the product; and FIG. 2 shows curves representing the effect of hydrogen addition rate on catalyst activity ($k_{nC_5}$), and isopentane conversion level.

In order to compare rates of isomerization, kinetic equations describing the disappearance of normal and cyclic alkyl hydrocarbons were derived. These equations permit the calculation of first order reaction rate constants for n-hexane ($k_{nC_6}$, hours$^{-1}$), methyl cyclopentane ($k_{MCP}$, hour$^{-1}$) and n-pentane ($k_{nC_5}$, hour$^{-1}$). In the case of n-hexane, the simple kinetic equation may be represented as follows:

(1) $$nC_6 \underset{k_{iC_6}}{\overset{k_{nC_6}}{\rightleftharpoons}} iC_6$$

where:

$nC_6$ = n-hexane
$iC_6$ = 3 methylpentane + 2 methylpentane + 2,3 dimethylbutane + 2,2, dimethylbutane
$k_{nC_6}$ = forward reaction rate constant, hours$^{-1}$
$k_{iC_6}$ = reverse reaction rate constant, hours$^{-1}$ Assuming that both forward and reverse reactions are first order, the rate equation for isomerization of n-hexane may be expressed as follows:

(2) $$\frac{d\left(\frac{C_n}{100}\right)}{d\theta} = -k_{nC_6}\left(\frac{C_n}{100}\right) + k_{iC_6}\left(\frac{C_i}{100}\right)$$

where:

$\dfrac{d\left(\frac{C_n}{100}\right)}{d\theta}$ = rate of disappearance of $nC_6$ with time (assuming the volume fraction is equivalent to mol fraction), hour$^{-1}$ $C_n$ = the volume percent $nC_6$ based on the $C_6$ paraffinic fraction in the reactor $C_i$ = volume percent $iC_6$ based on the $C_6$ paraffinic fraction in the reactor In the case of the isomerization of methyl cyclopentane to cyclohexane, these components are substituted for $nC_6$ and $iC_6$, respectivley, in the equation; and similarly for the isomerization of n-pentane to isopentane, n-pentane and isopentane are substituted for $nC_6$ and $iC_6$, respectively.

For a batch stirred reactor, Equation (2) can be integrated directly to give a simple equation for correlation of the data:

(3) $$k_{nC_6} = \frac{100 - C_1}{100} \frac{1}{\theta} \ln \frac{C_f - C_1}{C_p - C_1}$$

where:

$k_{nC_6}$ = reaction rate constant for the disappearance of normal hexane hours$^{-1}$
$\theta$ = length of interval, hours
$C_1$ = equilibrium of normal hexane in volume percent at the reaction temperature
$C_f$ = volume percent $nC_6$ in the paraffinic $C_6$ fraction of the feed
$C_p$ = volume percent $nC_6$ in the paraffinic $C_6$ fraction of the product In a similar manner, a kinetic equation for evaluation and correlation of data resulting from the operation of a small continuous fixed bed reactor is obtained by direct integration of the differential equation for the isomerization of normal hexane, methyl cyclopentane and normal pentane in this system and is as follows:

(4) $$k_{nC_6} = \frac{100 - C_1}{100} \frac{F}{V_s} \ln \frac{C_f - C_1}{C_p - C_1}$$

(5) $$k_{MCP} = \frac{100 - C_1}{100} \frac{F}{V_s} \ln \frac{C_f - C_1}{C_p - C_1}$$

(6) $$k_{nC_5} = \frac{100 - C_1}{100} \frac{F}{V_s} \ln \frac{C_f - C_1}{C_p - C_1}$$

where:

$k_{nC_6}$, $k_{MCP}$, or $k_{nC_5}$ = reaction rate constant for the disappearance of normal hexane, methyl cyclopentane, or normal pentane in hours$^{-1}$.
$F$ = feed rate in ml./hr.
$V_s$ = vol. of reactor space in ml. [% vol. of void (50%) × catalyst vol.].
$C_f$ = vol. % normal hexane in the paraffinic $C_6$ fraction, methyl cyclopentane in the cyclic alkyl $C_6$ fraction or normal pentane in the paraffinic $C_5$ fraction of the feed.
$C_p$ = vol. % normal hexane in the paraffinic $C_6$ fraction, methyl cyclopentane in cyclic alkyl $C_6$ fraction or normal pentane in the paraffinic $C_5$ fraction of the product.

These equations were derived on the basis that no back mixing occurs in a fixed bed reactor system (piston flow).

The conversion of hydrocarbon in question is calculated as follows:

(1) Based on actual disappearance of hydrocarbons:

$$\text{Vol. \% conversion} = \frac{C_f - C_p}{C_f} \times 100$$

(2) Based on thermodynamic equilibrium:

$$\text{Vol. \% conversion} = \frac{C_f - C_p}{C_f - C_1} \times 100$$

where:

$C_1$ = volume percent $nC_6$ in paraffinic $C_6$ fraction at thermodynamic equilibrium at reactor temperature, volume percent MCP in cyclic alkyl $C_6$ fraction at thermodynamic equilibrium at reactor temperature or volume percent $nC_5$ in paraffinic $C_5$ fraction at thermodynamic equilibrium at reactor temperature.

The effects of adding the critical amounts of hydrogen to the hydrogen chloride partial pressure aluminum chloride catalyzed isomerization system were evaluated in a pilot unit. This unit consisted of two HCl feed saturators, a sludge pretreater, four series up-flow reactors with provisions for temperature control by means of hot oil baths and for periodic sludge removal for transfer to the pretreater, pumps for pumping the feed HCl mixture from the feed saturator through the reactors, a valve for holding the desired back pressure on the reactors and a Foxboro $d/p$ cell-capillary tube arrangement for the accurate additions of small quantities of hydrogen. The catalyst which consisted of solid 10 to 12 mesh commercial $Al_2Cl_6$ was replenished at intervals of about 168 hours to provide make-up for that removed as sludge drained off the catalyst and for that dissolved in the product. The majority of the HCl was flashed off on the downstream side of the back pressure valve and passed through condensers held at −20° to −40° F. to scrub out the light hydrocarbons and return them to the product receiver (held at about 32° F.). The HCl, $H_2$ and non-condensible hydrocarbons were passed through caustic scrubbers to remove the HCl and then through a wet test meter to measure the tail gas. The product was washed with ice water to remove dissolved HCl and $Al_2Cl_6$ and analyzed using a gas chromatograph.

The data showing the critical effect of the hydrogen adidtion are presented in FIGS. 1 and 2. This data represented by the curves in these figures show that the amount of hydrogen added is critical over a relatively low range as to catalyst activity and deleterious side reactions (cracking and benzene complexing). But as seen from curves A and B of FIG. 1, and C and D of FIG. 2, the catalyst activity and the $iC_5$ and the $iC_6$ conversion levels increase with a decrease in hydrogen addition until about 0.3 mol percent hydrogen based on the feed is reached and then both begin to decline when the addition of hydrogen is further decreased. It is also seen from these figures that decreasing the hydrogen addition rate from about 4.0 mol percent to about 0.3 mol percent based on the hydrocarbon feed decreases the amount of benzene recovered in the product from about 95 to about 75 volume percent, curve E, FIG. 1 with only an increase in the total C₄'s of about 0.2 volume percent (from about 0.3 to about 0.5 volume percent), curve F, FIG. 1. In addition to the decline in catalyst activity cracking begins to increase rapidly when the addition of hydrogen is stopped. This is shown by an increase in total C₄'s in the product from about 0.3 to 0.7 volume percent, curve F, FIG. 1. Although the C₄ production of 0.7 volume percent is not considered harmful, it evidences that cracking is increasing rapidly and based on experience it is known that when cracking begins to increase at this rapid rate, the system soon becomes specific for cracking reactions instead of for isomerization.

Having fully described the method, operation and objects of my invention, I claim:

An improved isomerization process comprising contacting in a reactor a feedstock consisting essentially of normal paraffinic and cyclo paraffinic hydrocarbons having 4 to 7 carbon atoms per molecule, with as a sole added catalyst solid aluminum chloride and hydrogen chloride in the presence of hydrogen added in the amount of about 0.3 to 4.0 mol percent hydrogen per mol of feed and at a temperature in the range of about 110° F. to 145° F., the hydrogen chloride partial pressure being sufficient to maintain in the liquid phase in the reactor about 10 to 44 wt. percent hydrogen chloride based on the hydrogen chloride-hydrocarbon mixture.

References Cited by the Examiner
UNITED STATES PATENTS

| | | | |
|---|---|---|---|
| 2,288,866 | 7/42 | Hoog | 260—666 |
| 2,361,508 | 10/44 | Stahly et al. | 260—683.75 |
| 2,404,436 | 7/46 | Crawford et al. | 260—683.76 |

ALPHONSO D. SULLIVAN, *Primary Examiner.*